US012357858B2

(12) United States Patent
Parsons et al.

(10) Patent No.: US 12,357,858 B2
(45) Date of Patent: Jul. 15, 2025

(54) FIRE EXTINGUISHING DISCHARGE NOZZLE FOR HELICOPTER ENGINE COMPARTMENT

(71) Applicant: Textron Innovations Inc., Providence, RI (US)

(72) Inventors: Thomas Dewey Parsons, Fort Worth, TX (US); Keith David Weaver, North Richland Hills, TX (US); Chris James Ludtke, Grapevine, TX (US); Paul Madej, Grand Prairie, TX (US); Andrew Jordan Birkenheuer, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/401,453

(22) Filed: Dec. 30, 2023

(65) Prior Publication Data

US 2024/0173582 A1 May 30, 2024

Related U.S. Application Data

(62) Division of application No. 17/158,496, filed on Jan. 26, 2021, now Pat. No. 11,865,382.

(51) Int. Cl.

| | |
|---|---|
| ***A62C 3/08*** | (2006.01) |
| ***A62C 31/02*** | (2006.01) |
| ***A62C 35/02*** | (2006.01) |
| *A62C 35/68* | (2006.01) |

(52) U.S. Cl.
CPC ................ *A62C 3/08* (2013.01); *A62C 31/02* (2013.01); *A62C 35/023* (2013.01); *A62C 35/68* (2013.01)

(58) Field of Classification Search
CPC ......... A62C 3/08; A62C 31/02; A62C 35/023; A62C 35/68
USPC ........................................................... 169/62
See application file for complete search history.

(56) References Cited

U.S. PATENT DOCUMENTS

| | | | | |
|---|---|---|---|---|
| 1,955,086 A * | 4/1934 | Pallotta | A62C 35/605 | 169/57 |
| 2,311,844 A * | 2/1943 | Lindsay | A62C 99/0027 | 137/627 |
| 2,340,006 A | 1/1944 | MacGregor | | |
| 3,783,946 A | 1/1974 | Petrinec et al. | | |
| 4,351,394 A | 9/1982 | Enk | | |
| 8,733,463 B2 | 5/2014 | Meier | | |
| 2015/0283415 A1 | 10/2015 | Ernfjall et al. | | |
| 2020/0298036 A1 | 9/2020 | Partridge et al. | | |

* cited by examiner

*Primary Examiner* — Christopher S Kim
(74) *Attorney, Agent, or Firm* — Fogarty LLP

(57) ABSTRACT

Embodiments are directed to a rotorcraft comprising an airframe having an engine compartment, an engine disposed within the engine compartment, at least one fire bottle configured to hold a fire extinguishing agent, at least one agent tube coupled to the fire bottle and configured to carry the fire extinguishing agent to the engine compartment, and a nozzle on the at least one agent tube, the nozzle positioned below the engine and oriented in a upward-facing direction. The nozzle has at least one opening that is closed by a spring-loaded valve.

2 Claims, 7 Drawing Sheets

FIRE EXTINGUISHING DISCHARGE NOZZLE FOR HELICOPTER ENGINE COMPARTMENT

CROSS-REFERENCE TO RELATED APPLICATION

This is a divisional of, and claims benefit of, U.S. patent application Ser. No. 17/158,496, also entitled "Fire Extinguishing Discharge Nozzle for Helicopter Engine Compartment," filed Jan. 26, 2021, which is hereby incorporated by reference herein in its entirety.

BACKGROUND

Aircraft include many systems that facilitate operation and safety of the aircraft. For example, engines provide power, either directly or indirectly, to other systems such as rotor systems, gear boxes, flight control systems, interior environmental control systems, and the like. Such systems include liquids, such as fuel and lubricants, to facilitate operations. For example, fuel is burned to power components and lubricants are employed to reduce wear on components and to transfer heat away from components. These flammable liquids can sometimes escape from their respective systems, which increases the risk of fire in an aircraft engine compartment. Aircraft typically have an onboard system designed to extinguish fires, such as fire bottles located in the fuselage with tubing that brings a fire extinguishing agent into the engine compartment where the agent is disbursed by discharge nozzles. The fire bottles are typically electrically operated after manual selection by the flight crew based upon automatic fire detection.

SUMMARY

Embodiments are directed to systems and methods for providing a fire extinguishing system having nozzles for distributing a fire extinguishing agent, wherein the nozzles are oriented to prevent accumulation of water, rain, humidity, or other liquids and foreign object debris/damage (FOD).

In one example embodiment, a rotorcraft comprises an airframe having an engine compartment, an engine disposed within the engine compartment, a fire bottle configured to hold a fire extinguishing agent, at least one agent tube coupled to the fire bottle and configured to carry the fire extinguishing agent to the engine compartment, and a nozzle on the at least one agent tube, the nozzle positioned above the engine and oriented in a downward-facing direction. The nozzle has at least one opening and is configured to allow liquid or other FOD to drain out of the at least one opening instead of allowing the liquid or other FOD to flow into the at least one agent tube. The nozzle may have a chamfer opening that faces downward. The agent tubes may comprise an inverted trap section that is configured to allow liquid or other FOD to drain out of the at least one agent tube instead of collecting in the at least one agent tube.

The rotorcraft may further comprise at least one vertical firewall enclosing the engine compartment, wherein the at least one agent tube penetrates the at least one vertical firewall. The fire bottle may be located above the engine.

The rotorcraft may further comprise an engine deck below the engine, wherein the at least one agent tube penetrates the engine deck, and wherein the at least one agent tube extends vertically upward to the nozzle, which is oriented facing down above most or all of the engine. The fire bottle may be located below the engine deck.

In another example embodiment, a rotorcraft comprises an airframe having an engine compartment, an engine disposed within the engine compartment, a fire bottle configured to hold a fire extinguishing agent, at least one agent tube coupled to the fire bottle and configured to carry the fire extinguishing agent to the engine compartment, and a nozzle on the at least one agent tube, the nozzle positioned below the engine and oriented in an upward-facing direction, wherein the nozzle is configured to prevent liquid from flowing into the at least one agent tube by a cover, valve, or membrane as discussed below.

The nozzle may comprise a hinged cover. The hinged cover may be held in a closed position by a spring. The spring may be configured to assert a force that is overcome by pressure generated by a fire extinguishing agent released from the fire bottle.

The nozzle may comprise a spring-loaded flapper valve.

The nozzle may comprise a discharge port, and a membrane configured to fit over the discharge port. The membrane may be configured to rupture or release when exposed to pressure generated by a fire extinguishing agent released from the fire bottle.

The nozzle may comprise a discharge port, and a cap configured to fit over the discharge port. The cap may be configured to expose the discharge port when subject to pressure generated by a fire extinguishing agent released from the fire bottle.

BRIEF DESCRIPTION OF THE DRAWINGS

Figure 1:
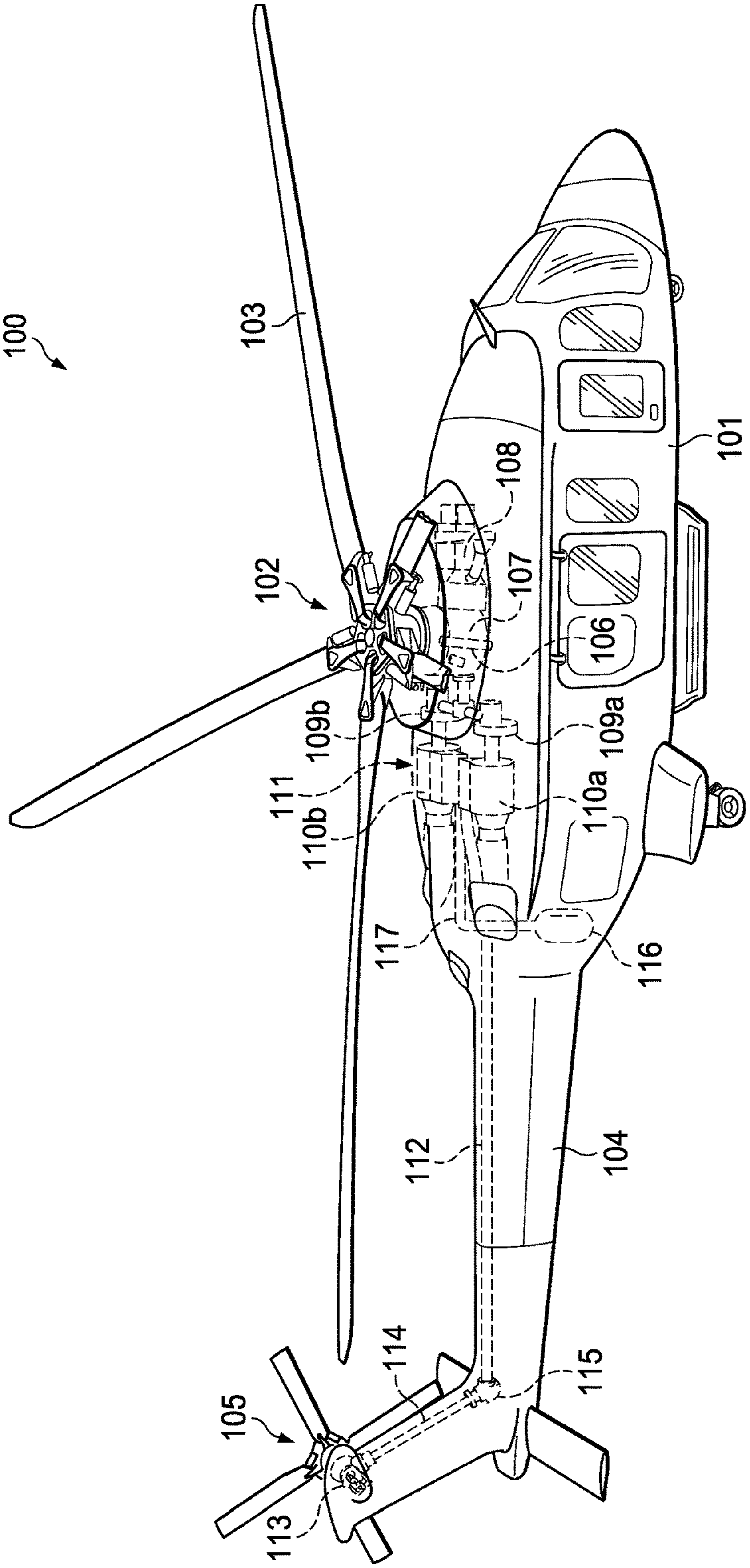

Having thus described the invention in general terms, reference will now be made to the accompanying drawings, which are not necessarily drawn to scale, and wherein:

FIG. 1 shows an aircraft adapted for user with embodiments of the present application.

Figure 2:
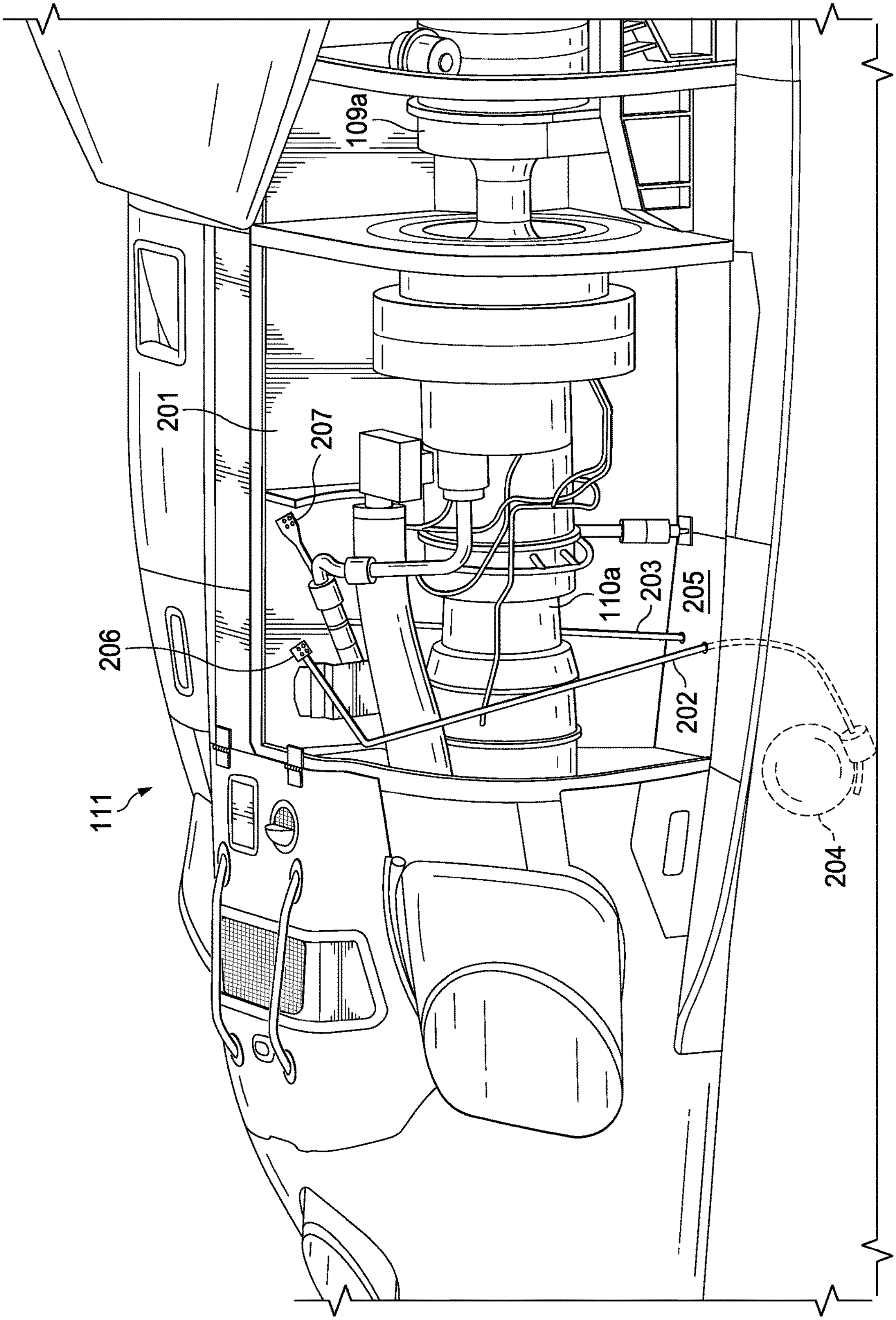

FIG. 2 is a view of an engine compartment of a rotorcraft illustrating one embodiment of the fire extinguishing system.

Figure 3:
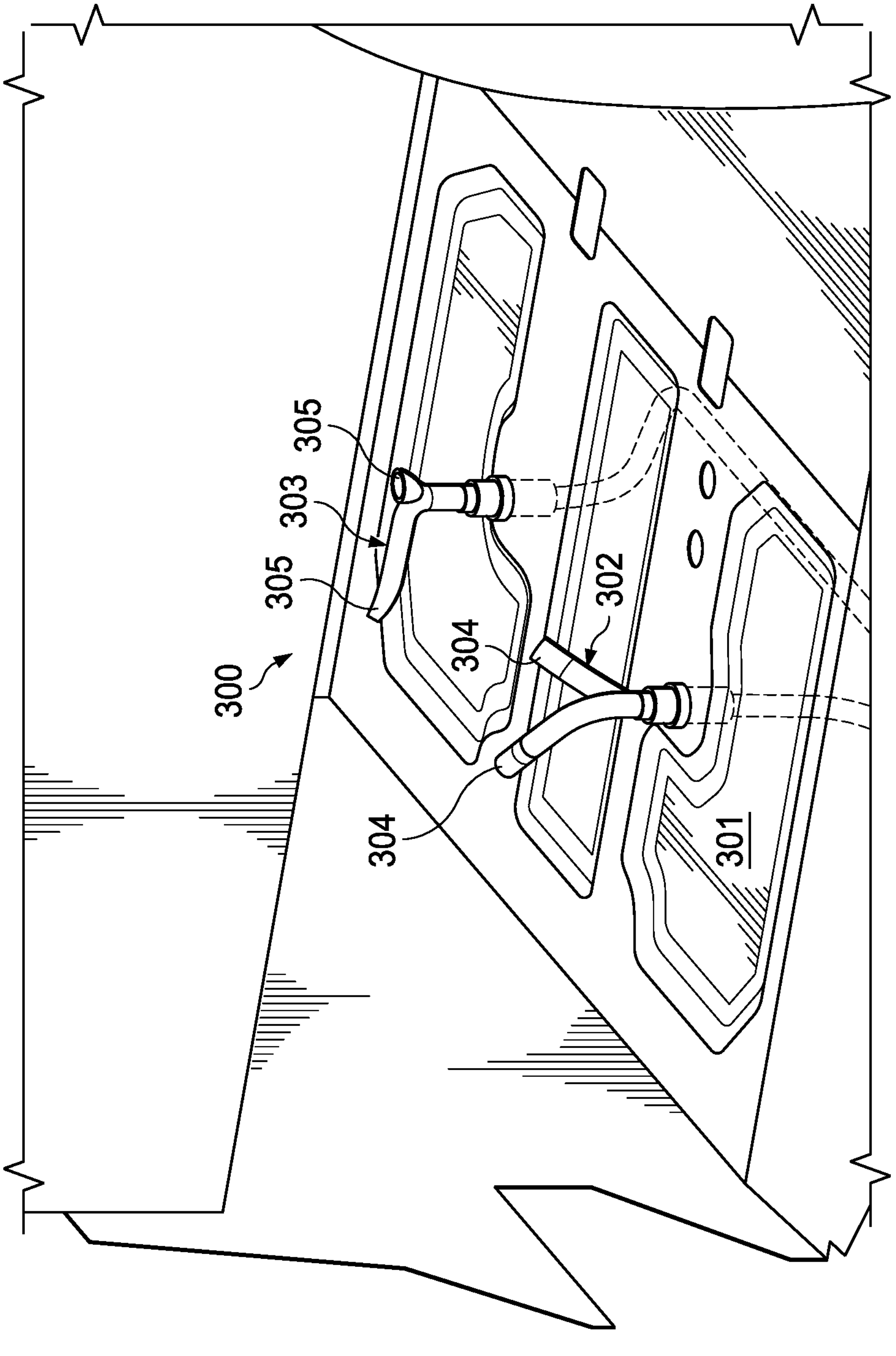
FIG. 3 (PRIOR ART)

FIG. 3 depicts a prior art engine compartment for an aircraft, such as a rotorcraft.

Figure 4:
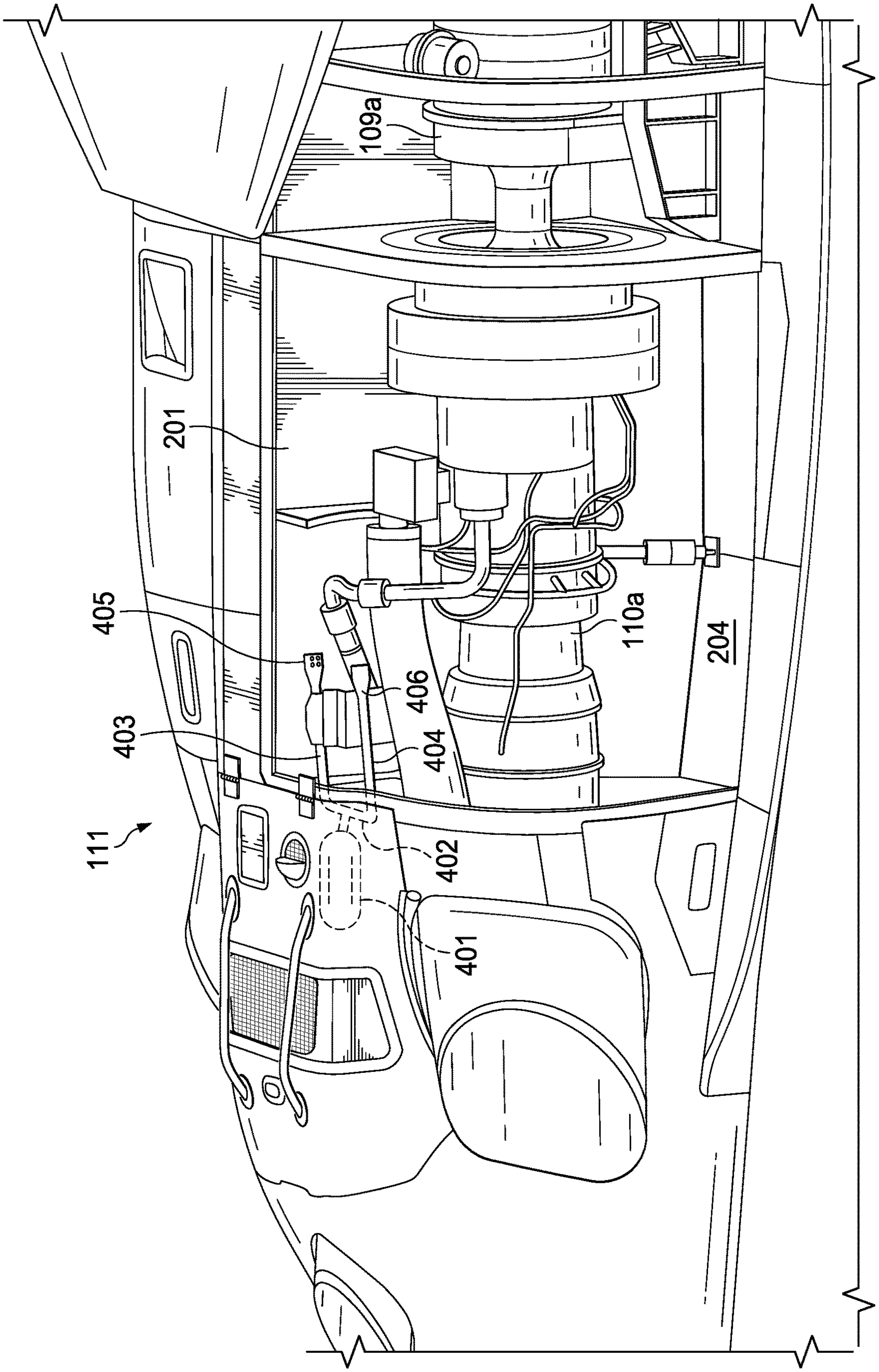

FIG. 4 depicts an engine compartment of an aircraft illustrating an alternative embodiment of a fire extinguishing discharge system.

Figure 5:
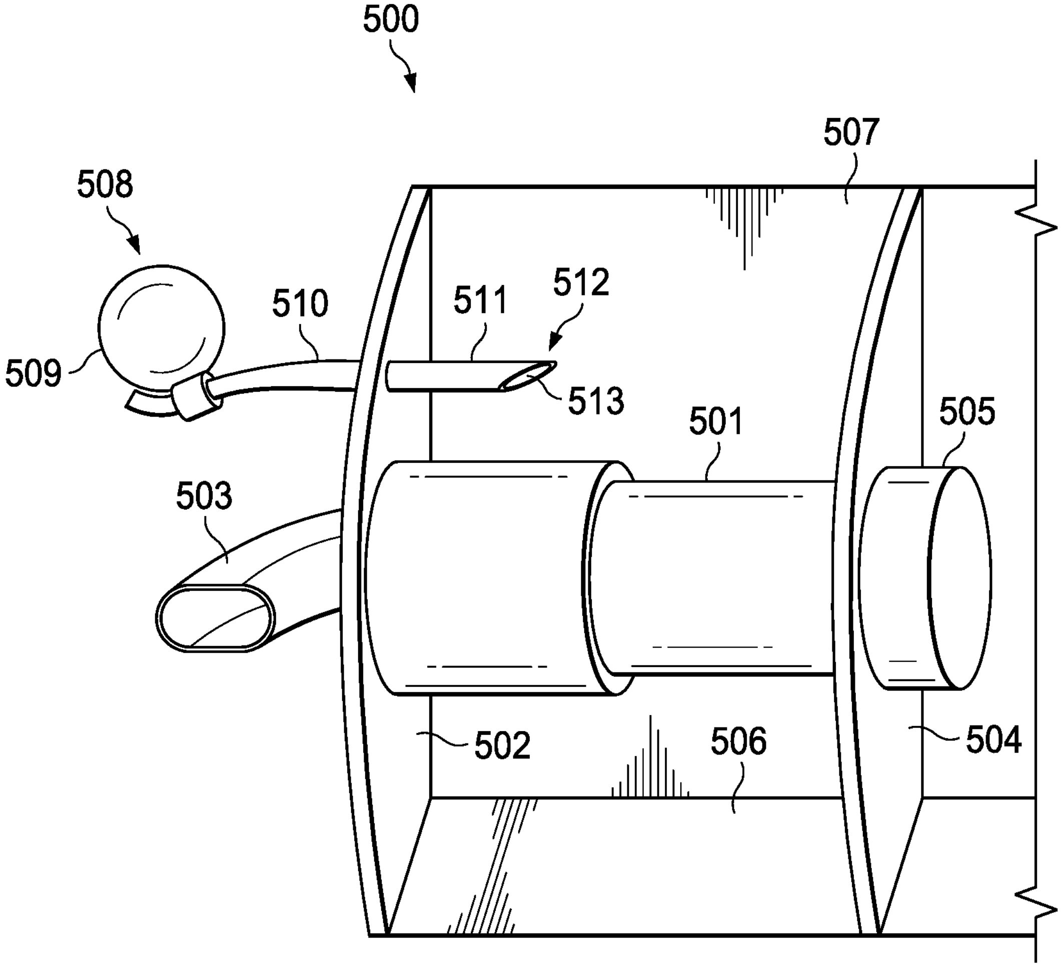

FIG. 5 depicts an alternative fire extinguishing discharge nozzle configuration having a chamfer nozzle.

Figure 6:
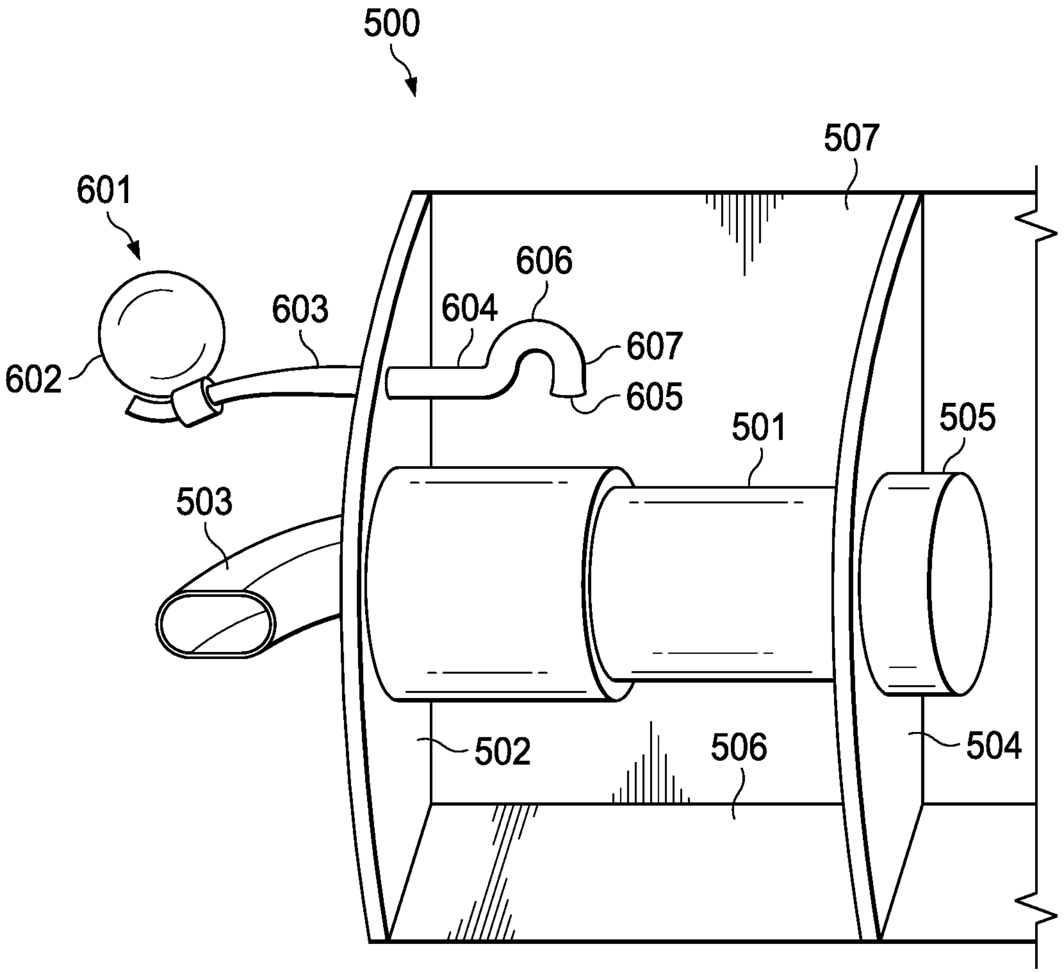

FIG. 6 depicts an alternative fire extinguishing discharge nozzle configuration having a trap nozzle.

Figure 7:
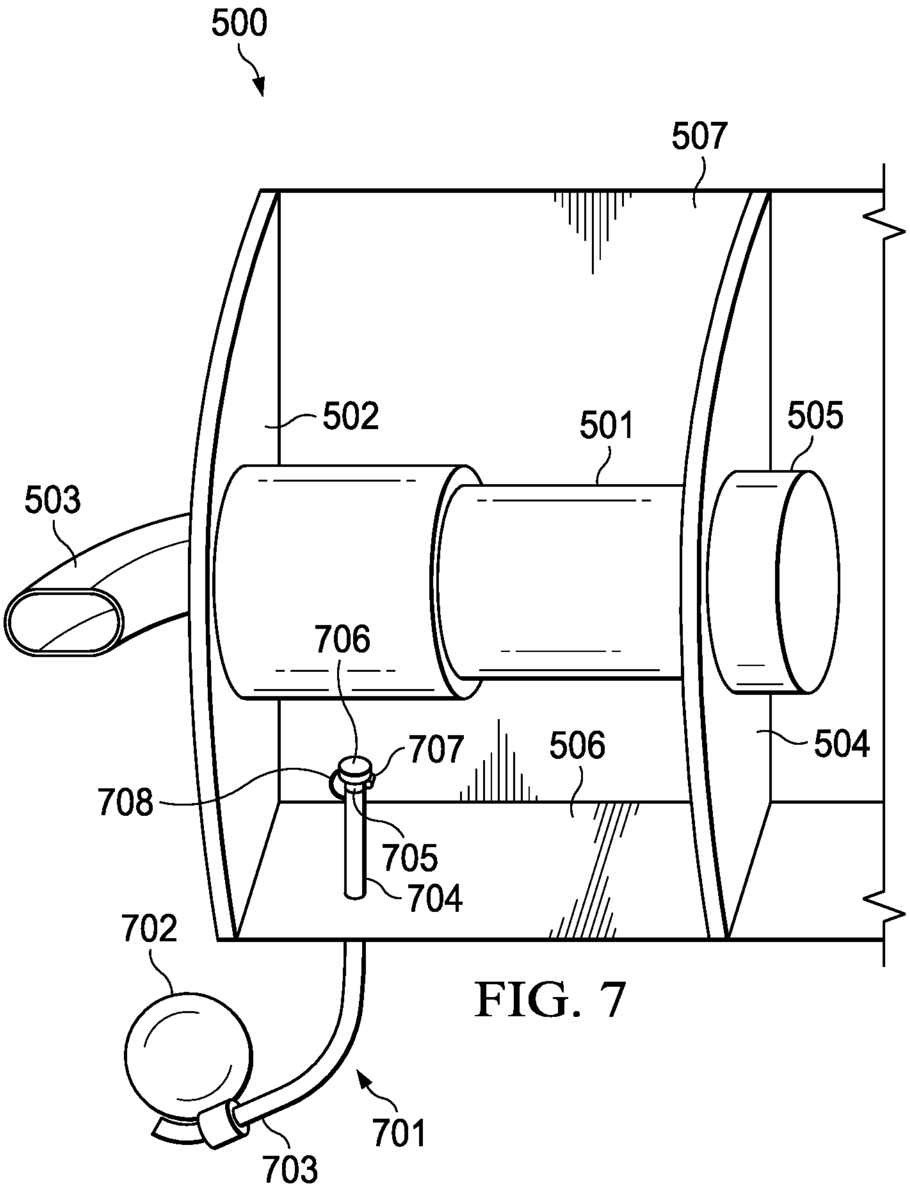

FIG. 7 depicts an alternative fire extinguishing discharge nozzle configuration having a capped nozzle.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 shows an aircraft 100 in accordance with embodiments of the present application. In the exemplary embodiment, aircraft 100 is a helicopter having a fuselage 101 with an airframe (not shown) and a rotor system 102 coupled to the airframe. A plurality of rotor blades 103 is operably associated with a rotor system 102 for creating flight. The pitch of each rotor blade 103 can be managed or adjusted to selectively control direction, thrust, and lift of the aircraft 100.

A tail boom 104 is depicted that further includes tail rotor and anti-torque system 105. The tail structure 104 may be used as a horizontal stabilizer. Aircraft 100 further includes a rotor mast 106, which connects the main rotor 102 to a main rotor gearbox 107. The main rotor gearbox 107 is connected to one or more accessory gear boxes 108 and one or more reduction gearboxes 109*a*, 109*b*. Each reduction gearbox 109*a*, 109*b* is connected to one or more engines 110*a*, 110*b*, which are within an engine compartment 111. A tail rotor drive shaft 112 is connected to the main rotor gearbox 107 and transmits mechanical rotation to the tail rotor gear box 113 via tail rotor drive shaft 114 and intermediate gear box 115.

Engines 110*a*, 110*b* are the primary source of power for aircraft 100. Torque is supplied to the rotor system 102 and the anti-torque system 105 using engines 110*a* and 110*b*. One or both of the engines 110*a*, 110*b* may leak or otherwise expel liquids into the compartment 111. Such liquids are often flammable and may include, for example, petroleum-based fuel, coolant, heat-transfer fluid, hydraulic fluid, and/or a lubricant. Fire suppression in aircraft 100 may use both passive and active systems to reduce and eliminate fires. Passive methods include, for example, the use of noncombustible materials, separation by firewalls, compartmentalization, isolation, ventilation and cooling, and proper drainage. Active methods include fire detection and extinguishing systems. One or more engine fire bottles 116 and associated engine fire extinguishing tubing 117 are mounted inside fuselage 101 and below engine compartment 111. Engine fire bottles 116 contain a fire extinguishing agent, such hydrofluorocompounds (HFCs), that may be released into engine compartment 111 upon activation by a pilot.

It should be appreciated that the aircraft 100 of FIG. 1 is merely illustrative of a variety of aircraft that can be used to implement embodiments of the present disclosure. Other aircraft implementations can include, for example, tiltrotors, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

FIG. 2 is a view of the engine compartment 111 of aircraft 100 illustrating reduction gearbox 109*a* and engine 110*a*. Engine compartment 111 is depicted as partially open, such as by removing maintenance or access panels on fuselage 101. A firewall 201 separates engine 110*b* from engine 110*a*. Firewall 201 provides passive fire suppression by isolating the engines 110*a*, 110*b* from each other so that a fire involving one engine does not spread to the other engine. Firewall 201 may be formed using titanium or other appropriate flameproof bulkhead material that separates the engine compartment from the rest of aircraft 100. Firewall 201 prevents any hazardous quantity of liquid, gas, or flame from passing through the firewall to other parts of aircraft 100.

In addition to passive fire protection, engine 110*a* also has an active fire extinguishing system comprising extinguishing agent tubes 202, 203 that are coupled to fire bottle 204 below engine deck 205. Agent tubes 202, 203 rise from engine deck 205 along and around opposite sides of engine 110*a*. Agent tubes 202, 203 terminate in nozzles 206, 207, which are positioned above engine 110*a* and configured to maximize distribution of fire extinguishing agent in the event of an engine fire. Nozzles 206 and 207 are generally downward facing so that water and other fluids that drip or splash on tubes 202 and 203 do not get captured by nozzles 206 and 207.

Although FIG. 2 illustrates agent tubes 202, 203 as located within engine compartment 111, it will be understood that, in other embodiments, the agent tubes may be routed outside engine compartment 111 between fire bottle 204 and a point above engine 110*a*. The agent tubes 202, 203 and/or nozzles 206, 207 may enter the engine compartment 111 through a vertical firewall, for example. In other embodiments, the fire bottle 204 may be located within engine compartment 111.

The deployment of agent tubes 202, 203 and nozzles 206, 207 above engine 110*a* is an improvement over prior fire suppression systems. Traditionally, engine fire extinguishing discharge nozzles for a helicopter are positioned below the engine and direct agent upwards to fill compartment. The orientation of prior designs is prone to accumulating moisture and FOD in the agent tubes due to water from engine wash, rain, and humidity. As a result, prior fire suppression systems were at risk of fire bottle failures, for example, due to corrosion resulting from wash fluid entering the tubes and backflowing to bottle. Extinguishing agent nozzles that are positioned below the engine are also susceptible to water and soap residue entering the agent tubes, which will corrode the agent tubes and fire bottles. By re-orienting the extinguishing agent nozzles, this can prevent accumulation of water, rain, humidity, and other FOD that could compromise the fire extinguishing system.

FIG. 3 depicts a prior art engine compartment 300 for an aircraft, such as a rotorcraft. Fire bottles (not shown) are located below engine deck 301. Agent tubes 302 and 303 extend from the fire bottles through deck 301 and terminate a short distance above deck 301. Nozzles 304, 305 face upwards and are directed toward an engine (not shown) in compartment 300. Water and soap may enter compartment 300 through cooling ducts or other gaps. For example, Liquid may enter when the aircraft is subjected to rainy weather conditions and/or pressurized water, such as while washing the engine or fuselage. Other fluids, such as fuel and oil, may also be present in compartment 300 due to leaks and maintenance. Liquid drainage systems will catch some of the water and other liquids and will carry them to locations outside compartment 300. However, upward-facing nozzles 304, 305 will also catch some of the liquids, which will then enter agent tubes 302 and 303. These liquids may then cause blockages and corrosion, which can impair the operation and reduce efficacy of the aircraft's fire suppression system.

FIG. 4 depicts an alternative fire extinguishing discharge nozzle configuration for a helicopter engine compartment. One or more fire bottles 401 are located above and/or behind engine compartment 111. Agent tubing 402 extends from fire bottle 401 and branches into agent tubes 403, 404, which enter compartment 111 above engine 110*a* and extend along opposite sides of engine 110*a*. Agent tubes 403, 404 end in downward-facing nozzles that minimize capture of water or other liquids that are sprayed, splashed, or dripped within compartment 111.

The configuration illustrated in FIG. 4 also minimizes the length of agent tubes 403 and 404 compared to the configuration shown in FIG. 2. The use of shorter agent tubes incurs a lower cost for the fire suppression system. The shorter agent tubes may also provide a higher pressure at the nozzles 405 and 406 compared to systems with longer agent tubes. Agent tubes 403 and 404 are approximately in plane with fire bottle 401, which also limits pressure drop along the agent tubes.

In other embodiments, nozzles 405 and 406 are positioned below fire bottle 401, which gives the agent lines 403, 404 a downward slope relative to the fire bottle 401. The downward slope will cause any water that does enter nozzles 405, 406 to drain back out of the agent tubes 403, 404 over time. This slope away from bottle 401 ensures that water does not collect in agent tubes 403 and 404 or at fire bottle 401, which minimizes corrosion, blockages, and other damage.

The embodiment illustrated in FIG. 4 provides several advantages over prior aircraft fire extinguishing systems. By reducing the opportunity for water and other liquid entering the agent tube, the embodiments disclosed herein eliminate the risk of clogging agent tubes thereby degrading the performance of the fire extinguishing system due to fluid in the agent tubes. The embodiments disclosed herein also eliminate the risk of corrosion on the squib cartridge at the fire bottle. Such corrosion could cause the squib to not fire or improperly fire thereby rendering the fire bottle inoperative. The improvements to the fire extinguishing system also eliminate maintenance inspections required to check and clear the agent tubes after an engine wash or rain.

FIG. 5 depicts an engine compartment 500 of an aircraft illustrating an alternative embodiment of a fire extinguishing discharge system. Engine 501 is located in compartment 500. An aft engine firewall 502 separates engine compartment 500 from engine exhaust 503, and a forward engine firewall 504 provides a barrier between engine 501 and reduction gearbox 505. Engine deck 506 separates the engine compartment 500 from the aircraft cabin. Firewall 507 separates engine 501 from a second engine compartment. A fire suppression system 508 provides fire protection to engine 501. Fire bottle 509 holds a fire extinguishing agent that can be released upon pilot command to flow through agent tube 510. The agent tube 510 penetrates through aft firewall 502 and ends in a nozzle 511. The nozzle 511 is configured to disburse the extinguishing agent inside compartment 500 and onto engine 501.

Nozzle 511 has a chamfer end 512 that is cut so that fire extinguishing agent is directed downward toward engine 501. Water, liquids, and FOD that fall on nozzle 511 is prevented from entering opening 513 due to the downward orientation of the opening 513 on the chamfer end 512. As result, water, liquid, and FOD do not enter agent tube 510 and do not flow back to fire bottle 509, which prevents corrosion and other damage to fire suppression system 508.

FIG. 6 depicts an engine compartment 500 as illustrated in FIG. 5 with an alternative embodiment of a nozzle for a fire extinguishing system. Similar elements in FIG. 6 are labeled the same as FIG. 5. Fire suppression system 601 provides fire protection to engine 501. Fire bottle 602 holds a fire extinguishing agent that can be released upon pilot command to flow through agent tube 603 to compartment 500. The agent tube 603 penetrates through aft firewall 502 as agent tube 604, which ends in a downward-facing nozzle 605. Agent tube 604 has an inverted trap section 606. In typical plumping, a P-trap is used to hold water in order to prevent the flow of gas, such as sewer gas, through a pipe. Inverted trap 606 has the opposite effect in that it is intended to not hold water. If water enters nozzle 605, it will not enter agent tube 604 because inverted trap 606 will cause the water to drain back out through nozzle 605. The water (or other liquid or FOD) will move vertically up tube section 607 and then gravity will pull the water straight back down and out of nozzle 605.

Although fire bottles 509 and 602 are shown as being on approximately the same level as nozzles 511 and 605, respectively, it will be understood that in other embodiments the fire bottle may be located above or below the discharge nozzle. Agent tubing 510, 603 may be routed as appropriate to connect fire bottles 509 and 602 to nozzles 511 and 605. For example, in other embodiments, the fire bottle may be located below engine deck 506 and the agent tubing may penetrate deck 506 and extend upward to position the nozzle 511 or 605 above engine 501.

FIG. 7 depicts another alternative embodiment of a nozzle for a fire extinguishing system. Similar elements in FIG. 7 are labeled the same as FIG. 5. Fire suppression system 701 provides fire protection to engine 501. Fire bottle 702 holds a fire extinguishing agent that can be released upon pilot command to flow through agent tube 703 to compartment 500. The agent tube 703 penetrates through deck 506 as agent tube 704, which ends in an upward-facing nozzle or discharge port 705. A cap 706 covers and protects nozzle 705 and agent tubes 704, 703. Water or other liquid or other FOD in compartment 500 are blocked from entering agent tubes by cap 706. Under normal operating conditions, cap 706 may be held in the closed position by a spring-loaded hinge 707. When the fire extinguishing agent needs to be deployed, it is released from fire bottle 702 into agent tubes 703, 704. The fire extinguishing agent will build pressure in agent tube 704, which then pushes cap 706 out of the way so that nozzle 705 is exposed and the fire extinguishing agent can flow freely into compartment 500.

In other embodiments, nozzle 705 and agent tubes 704, 703 may be protected by a closure that is held in a closed position by a mechanical device. The mechanical device is configured to assert a closing force that may be overcome by pressure generated by a fire extinguishing agent that is released from a fire bottle. The closure may be a hinged cover that is held in the closed position by a spring, a spring-loaded flapper valve, a spring-loaded check valve, or any other mechanically activated valve that is spring loaded whereby valve opens when pressure/force exceeds a certain specified threshold.

Alternatively, cap 706 may be connected to agent tube 704 by a tether or cable 708 so that cap 706 is blown off of agent tube 704 when the fire extinguishing agent is deployed. The tether or cable 708 keeps cap 706 attached to agent tube 704 so that cap 706 does not become FOD and tumble loosely in engine compartment 500.

In a further embodiment, spring-loaded cap 706 may be replaced with a disposable rupture membrane over the discharge port 705. The membrane may be thin stainless steel, for example, that would prevent water, liquid, and FOD from entering agent tube 704. The thin membrane will rupture easily on discharge of fire bottle 702 due to the pressure of the fire extinguishing agent in tube 704.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A rotorcraft comprising:

an airframe having an engine compartment;

an engine disposed within the engine compartment;

at least one fire bottle configured to hold a fire extinguishing agent;

at least one agent tube coupled to the at least one fire bottle and configured to carry the fire extinguishing agent to the engine compartment;

a nozzle on the at least one agent tube, the nozzle positioned below the engine and oriented in an upward-facing direction;

a spring-loaded hinge connected to one side of an outer surface of the nozzle; and a cap connected to the spring-loaded hinge, wherein the spring-loaded hinge is configured to hold the cap in a closed position covering the nozzle and to permit a pressure in the at least one agent tube to open the cap and expose the nozzle when the fire extinguishing agent is released from the at least one fire bottle.

2. A rotorcraft comprising:

an airframe having an engine compartment;

an engine disposed within the engine compartment;

at least one fire bottle configured to hold a fire extinguishing agent;

at least one agent tube coupled to the at least one fire bottle and configured to carry the fire extinguishing agent to the engine compartment;

an upward-facing nozzle on the at least one agent tube, the upward-facing nozzle positioned below the engine and oriented in an upward-facing direction, wherein the upward-facing nozzle further comprises:

a spring-loaded hinge connected to one side of an outer surface of the upward-facing nozzle;

a cap connected to the spring-loaded hinge, wherein the spring-loaded hinge is configured to hold the cap in a closed position covering the upward-facing nozzle and to permit a pressure in the at least one agent tube to open the cap and expose the upward-facing nozzle when the fire extinguishing agent is released from the at least one fire bottle; and one or more agent tubes coupled to at least one downward-facing nozzle and the at least one fire bottle, wherein the one or more agent tubes coupled to the at least one downward-facing nozzle are configured to carry the fire extinguishing agent to an upper area of the engine compartment, and wherein the at least one downward-facing nozzle is positioned above the engine and oriented to disperse the fire extinguishing agent from above the engine, wherein the one or more agent tubes coupled to the at least one downward-facing nozzle are configured so that gravity causes liquids and debris to drain out of the at least one downward-facing nozzle instead of allowing the liquids and debris to flow into the one or more agent tubes coupled to the at least one downward-facing nozzle.

* * * * *